Patented June 27, 1933

1,915,425

UNITED STATES PATENT OFFICE

HARRY KLOEPFER, OF FRANKFORT-ON-THE-MAIN, GERMANY, ASSIGNOR, BY MESNE ASSIGNMENTS, TO E. I. DU PONT DE NEMOURS AND COMPANY, A CORPORATION OF DELAWARE

PROCESS FOR MANUFACTURE OF CYANATES

No Drawing. Application filed April 4, 1930, Serial No. 441,719, and in Germany April 10, 1929.

My invention refers to a process for the manufacture of salts of cyanic acid and consists in reacting urea with alkali metal compounds in a dry state, that is, in the absence of solvents and at elevated temperatures. In carrying out the invention, I use alkali metal compounds of a basic character or acting like bases. Such compounds are, for instance, sodium carbonate, potassium carbonate, alkali metal hydrides and the like. Hydroxides of alkali metals, however, are not suitable, since by the application of the latter bodies, yields of 10 to 30% only of cyanates are obtained.

I have found it useful not to mix the entire quantity of the alkali metal compound required with the equivalent amount of urea right at the beginning, but to start with a somewhat smaller quantity of urea and to add the rest when the conversion has taken place either completely or in part. Advantageously I take altogether a little more than the equivalent quantity of urea. Thus I may, for instance, prepare a mixture of the basic compound of alkali metal with an insufficient amount of urea for complete reaction of the basic compound and heat this mixture to the requisite reaction temperature. As soon as the development of ammonia subsides, I add to the reacted mass the residual quantity, mix very thoroughly and heat the mixture again. After ammonia generation has ceased 85 percent and more of the reaction mass consists of cyanate.

Furthermore, I find it useful to heat the reaction mixture, after ammonia liberation has slowed down or ceased altogether, some time to higher temperatures, for instance, those exceeding 140° C. Heating may be carried if desired even up to fusion of the mixture or more, whereby the contents of cyanate in the product obtained may be increased to 90% and more. The subsequent heating to fusion temperature or higher applies, above all, to cases where potassium compounds have been utilized.

The yields which I attain by following my new process are unexpectedly high and allow of a larger scale manufacture of cyanates on an economical basis.

Example 1

5.0 kgms of urea are intimately mixed with 5.3 kgms of pulverized calcined soda carbonate. The mixture is subjected to a temperature of 130–140° C. after having been spread out in a thin layer, and the treatment continued until ammonia liberation ceases. The reaction mass is then mixed with a further quantity of 1.5 kgms of urea and again heated. After ammonia has ceased coming off the reaction product consists substantially of sodium cyanate. Through washing with water which contains sodium cyanate in solution the concentration of the product as regards cyanate may be increased further.

What I claim is:

1. Process for the manufacture of alkali metal cyanates which consists in heating urea with carbonates of alkali metals.

2. Process for the manufacture of alkali metal cyanates which consists in heating urea with the carbonate of an alkali metal in the dry state.

3. Process for the manufacture of alkali metal cyanates which consists in heating urea with the carbonate of an alkali metal in the dry state to temperatures of 130 to 150° centigrade.

4. Process for the manufacture of alkali metal cyanates which consists in heating urea with a compound of the group consisting of carbonates and hydrides of alkali metals.

5. Process for the manufacture of alkali metal cyanates which consists in heating urea with a compound of the group consisting of carbonates and hydrides of alkali metals to temperatures of 130 to 150° centigrade.

6. Process for the manufacture of alkali metal cyanates which consists in heating in the dry state, a compound of the group consisting of carbonates and hydrides of alkali metals with insufficient urea to completely react therewith at temperatures of 130 to 150° centigrade, adding sufficient urea to the reaction mass, after ammonia liberation has subsided, to react with the remaining quantity of the compound of said group and heating again.

7. Process for the manufacture of alkali metal cyanates which consists in heating in the dry state, a compound of the group consisting of carbonates and hydrides of alkali metals with insufficient urea to completely react therewith at temperatures of 130 to 150° centigrade, adding sufficient urea to the reaction mass, after ammonia liberation has subsided, to react with the remaining quantity of the compound of said group and heating subsequently to a temperature exceeding 150° centigrade.

Signed at Frankfort-on-the-Main, Germany, this 20th day of March A. D. 1930.

HARRY KLOEPFER.